Nov. 29, 1960   S. G. SHAND ET AL   2,962,039
FLUID CONTROLLING VALVES
Filed May 26, 1955   2 Sheets-Sheet 1

INVENTORS
Stanley Grapes Shand
& Arthur Cyril Gower
BY
ATTORNEY

Nov. 29, 1960    S. G. SHAND ET AL    2,962,039
FLUID CONTROLLING VALVES
Filed May 26, 1955    2 Sheets-Sheet 2

INVENTORS
Stanley Grapes Shand
& Arthur Cyril Gower
BY
ATTORNEY

United States Patent Office 2,962,039
Patented Nov. 29, 1960

2,962,039

FLUID CONTROLLING VALVES

Stanley Grapes Shand and Arthur Cyril Gower, both of The Saunders Valve Company Limited, Blackfriars St., Hereford, England Filed May 26, 1955, Ser. No. 511,184

Claims priority, application Great Britain May 27, 1954

14 Claims. (Cl. 137—219)

This invention relates to valves for the control of fluids. An object of the invention is to provide a valve which can be used to control fluids at very high pressures, say up to 4,000 lbs. per square inch, by means exerting only a moderate torque. The need arises, for example, on aircraft to control such valves from remote points by means of mechanical controls or comparatively small geared electric motors.

In a valve according to the present invention, one of two sealing members (one a resilient closure member and the other a seating) is carried by a piston slidable in and sealed to the valve casing and the other is sealed directly or indirectly to the valve casing, and mechanism is provided actuatable from outside the casing for positively separating the sealing members to open a passage from the inlet to the outlet of the valve casing, a small range of lost motion being allowed to the piston in relation to the mechanism in the closed position of the valve and a spring bias acting to take up the lost motion in a direction to bring the sealing members closer together, while the fluid pressure from the inlet side has access to an area of the back of the piston which when the valve is closed is greater than the area on which the fluid pressure acts in a direction tending to separate the sealing members so that when the valve is closed the fluid pressure holds it closed.

The piston may be moved bodily by the mechanism, the lost motion being provided between the mechanism and the piston. Alternatively the piston may be slidably sealed to the valve casing over a distance limited by stops, the piston being engaged by contact between the sealing members just before the valve is closed and remaining within the range determined by the stops when closing is completed. Up to this point of engagement there is lost motion between the piston and the sealing member which moves in relation to it. In the latter case, there may be two pistons each carrying one sealing member, the first piston being directly linked to the mechanism and the fluid pressure having constant access to the back of it so that the fluid pressure relieves the mechanism, if desired completely, of load when the valve is closed, and the second piston being the aforesaid piston which is slidable in the casing with lost motion in relation to the operating mechanism and on the back of which the closing fluid pressure acts.

Desirably the mechanism for positively separating the sealing members may be in a dead centre position when the valve is closed. Thus it may include a crank and connecting rod arranged so that they pass just beyond a dead-centre position when the valve is closed, so that it is self-locking in the closed position. Also this arrangement gives very high mechanical advantage in the neighbourhood of the actual closing position, though where two pistons are used the forces involved can in any case be held at a reasonable value by suitable choice of the effective area of the back of the first piston.

Experience has shown that the resilience of the closure member should not be too high otherwise the high pressure fluid tends to extrude it. A suitable material provided the fluid to be controlled is not such as will attack it chemically or tend to dissolve it is a fairly hard grade of India rubber having sufficient resilience to ensure a good seal but hard enough to prevent extrusion. Generally valves of the kind in question are used to control an inert gas such as nitrogen or a fairly inert gas such as air so that hard rubber is quite suitable. The use of the valve is not confined to inert gases or air, however, as by choice of a suitable resilient material, for example a suitable grade of synthetic rubber, the valve can be used for the control of other gases, oils, liquid fuels, or the liquids used in hydraulic apparatus. With a suitable lubricant it could also be used for oxygen under pressure.

The invention will be further described with reference to the accompanying drawings which show one preferred construction embodying the invention.

Figure 1:
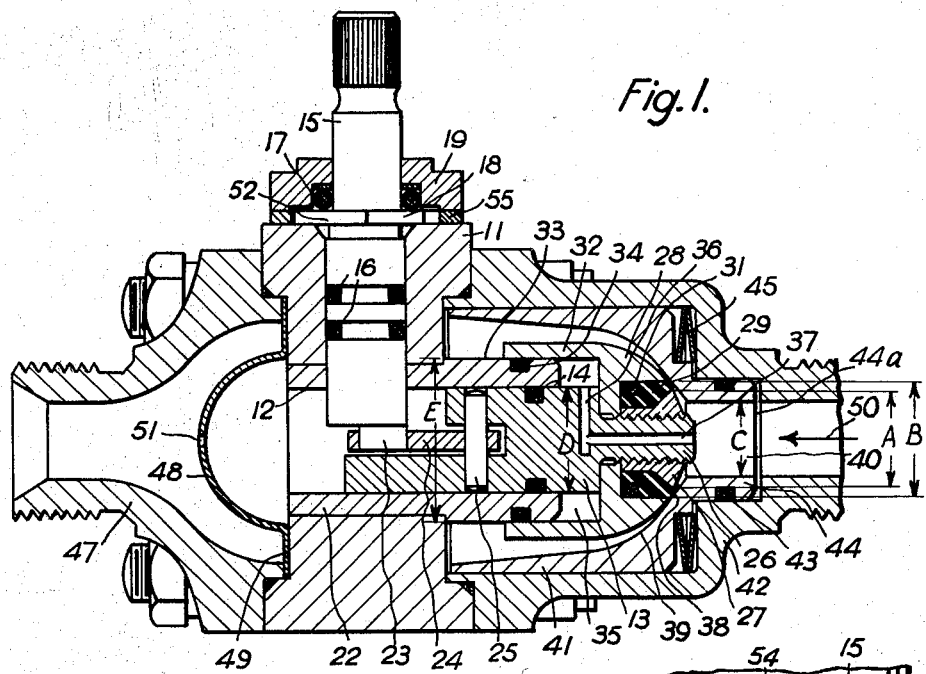
Fig. 1 is an axial section showing the valve closed.

In the construction illustrated the valve body 11 has a transverse bore 12 in which works a sliding piston body 13 sealed in the bore by one or more O-rings 14. An operating spindle 15 is journalled in a bore in the body at right angles to the bore 12 and is desirably sealed therein by O-rings 16 in grooves. In view of the high end pressure which may arise on the spindle, ball bearings 17 are interposed between a shoulder 18 on the spindle and an external collar 19 held by screws 21. For convenience, the bore 12 is formed in a part 22 made separately from the body 11 and afterwards fitted therein, the spindle 15 retaining it in place. The parts 12 and 22 whether made in one piece or in two as shown, together with the parts 42, 47 described below, constitute a valve casing having an inlet and an outlet. The inner end of the spindle 15 has an eccentrically located projecting crank pin 23 entering a bore at one end of a short connecting rod 24, the other end of which is pivotally connected at 25 to the piston body 13.

The piston body 13 has a spigot 26 at its end remote from the connecting rod, projecting from the bore 12 and threaded to receive a shouldered nut 27 which holds in place a piston head 28 and between the head and the nut an annular closure member 29 of a material of sufficient resilience to make a good seal, for example, a fairly hard rubber. The closure member 29 is provided with an O-ring 31 to seal it to the head 28 thus preventing leakage along its upper surface and its end surface projects a little from the surface defined by the nut 27 and the head 28. The head has a skirt 32 which works over a machined surface 33 of the part 22 projecting from the body and it is sealed by the aid of one or more O-rings 34 in grooves. There is thus formed between the piston body 13, head 28 and skirt 32, on one hand and the end of the part 22 on the other an annular chamber 35 and this communicates through a radial passage 36 with an axial passage 37 opening in the end of the spigot 26.

The closure member 29 co-operates with a seating surface 38 formed at the inner end of a cup-shaped recess 39 in a second piston 41 sliding in an inlet fitting 42 connected to one side of the valve body and having a pipe connection formed in it. The second piston 41 is sealed to the end member by one or more O-rings 43 which may co-act with any convenient surface, in the illustrated example with the surface of a central spigot 44 fitting in a bore in the end member. A spring, here shown by way of example as a pair of dished plate springs or Belleville washers, 45 urges the second piston 41 towards the valve body 11. The fluid on the inlet side has access through a central bore 40 in the spigot 44 to the interior of the recess 39 within the sealing 38 and also to the annular end surface 44a of the spigot 44. A pair of part-annular passages 46 pass through the body 11 so as to clear the spindle and other working parts and they form a communication between the recess 39 and an outlet fitting 47 connected to the other side of the body, which tapers down to a suitable pipe connection. The passage at this side may be faired off to improve the flow by a hemispherical or similar dome 48 secured to the side of the body 11. The dome may be held by lugs 49 between the body 11 and the end fitting 47. The two end fittings 42, 47 may have spigots fitting into recesses in the body 11. An aperture 51 in the dome 48 prevents trapping of any fluid leaking past the piston body 13.

The fluid flow is in the direction of the arrow 50 in Fig. 1. When the valve is closed, the fluid pressure on the inlet side acts directly on the annular end surface 44a of the spigot 44, it fills the space within the closure member 29 and seating 38 (up to diameter A, Fig. 1), and through the passages 37, 36 also acts within the chamber 35. The linkage 15, 23, 24 holds the assembly 13, 28, 27, 29, 31 constituting the first piston stationary, while the springs 45 and the pressure acting on that part of the annular area 44a lying outside the diameter A, that is on the annular area between the diameters A and B, act together to provide the pressure of the seating 38 against the closure member 29. The pressure provided by the springs is comparatively low and substantially constant. The net fluid pressure acting on the annulus 44a between the diameters A and B is proportional to the line pressure and if this area is larger than the area of the annulus between the diameter C of the bore 40 and the diameter A, over which the line pressure acts to press the seating 38 away from the closure member 29, when the valve is closed there will always be a positive fluid pressure holding it closed, whatever the line pressure. By choice of the diameters A, B and C in relation to the resilience and other qualities of the closure member 29, a good seal of the closure member 29 against the seating 38 can always be obtained.

The fluid pressure within the chamber 35 acts to urge the first piston assembly in the closing direction, that is to the right in Fig. 1 and is effective over the area of the annulus between the diameter D of the piston body 13 and the diameter E of the surface 33, while the total fluid pressure acting to urge this assembly in the opposite direction is that acting on a circular area of diameter B, made up in part of a circular area diameter A on the end of the piston head 28 (except for the area of the passage 37), and the rest through the second piston, over the area of the annulus 44a from diameter A to diameter B. Ignoring the pressure of the springs 45, the difference between these two forces, i.e., the difference between the area of the annulus between the diameters D and E and the area of the circle of diameter B multiplied by the fluid pressure, determines the net axial force acting on the first piston assembly, and this in turn determines the load on the connecting rod 24 and therefore the torque on the spindle 15 necessary to start opening the valve, quite independently of the actual sealing pressure of the closure member against the seating 38. Thus the construction of the valve enables the sealing pressure and the opening force to be determined independently of one another. By suitable choice of the diameters D and E in relation to the diameter B the torque to start opening the valve can be given any desired value in relation to the line pressure. Further the force acting on the first piston assembly due to the access of the line pressure to the chamber 35 relieves the connecting rod 24 of thrust load to the same extent. It is even possible to make the force high enough to put the rod 24 into tension. It is in fact preferred to make the diameters D and E such that the pressure load urging the first piston assembly to the right slightly overbalances the pressure load acting in the opposite direction.

Figure 3:
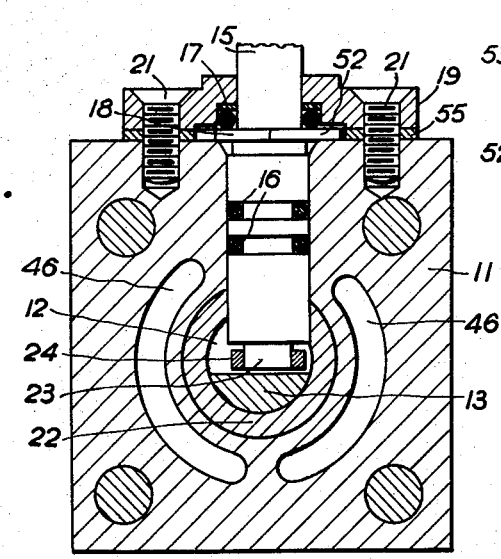
Fig. 3 is a cross section of Fig. 1 taken approximately on the axis of the valve spindle.
Figure 2:
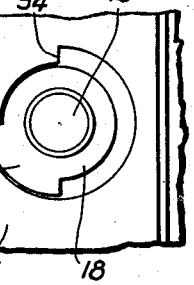
Fig. 2 is a detail plan view of the valve with certain parts removed.
Figure 4:
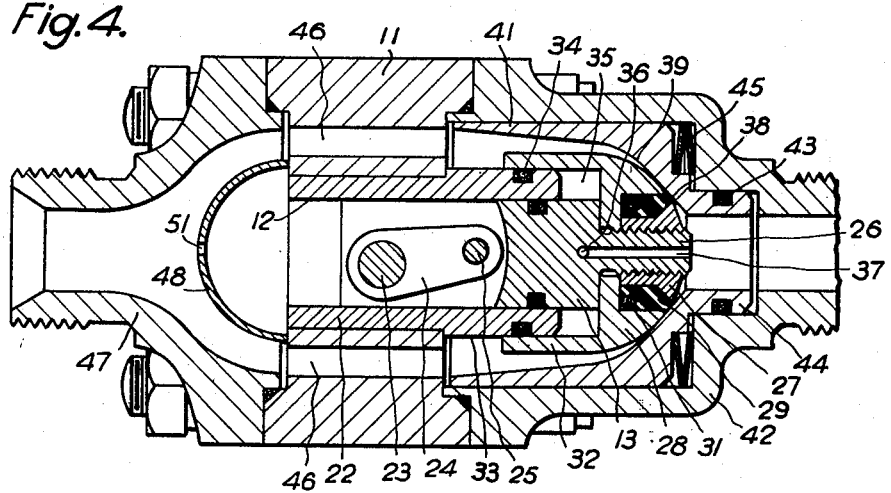
Fig. 4 is a longitudinal section taken at right angles to Fig. 1 with the valve closed.
Figure 5:
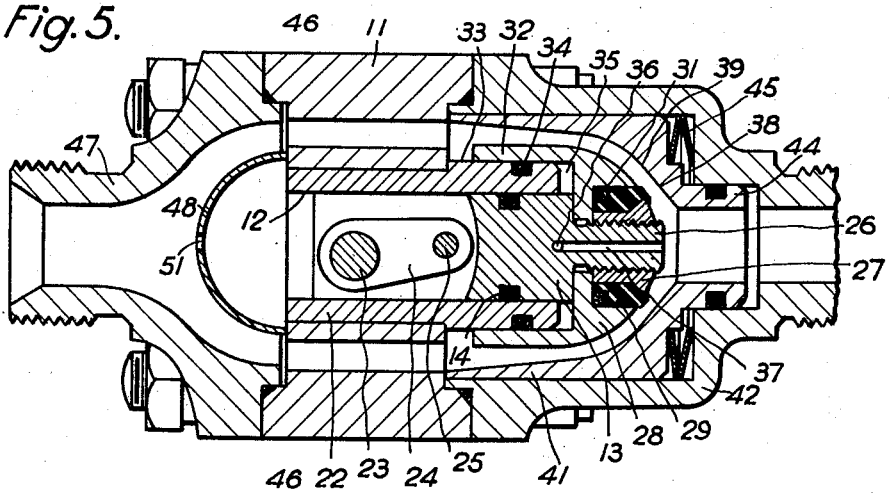
Fig. 5 is a similar section to Fig. 4 but with the valve open.

The rotation of the spindle 15 is limited to about 180°, the spindle rotating counterclockwise as seen in Figs. 3 and 4 to open the valve and the parts are so proportioned that in the extreme position of the spindle with the valve closed, the crank pin 23 is just over dead-centre (see Fig. 4), thus rendering the valve self-locking. Any convenient means for limiting the rotation of the spindle may be provided and may be included in the external operating mechanism or in the construction of the valve itself. As shown in Fig. 2 of the illustrated example the shoulder 18 has a projecting part 52 which co-operates with shoulders 53, 54 formed in a plate 55 held between the collar 19 and the valve body. An advantage of the particular operating mechanism shown is that in the first phase of opening the crank pin and connecting rod are working with a very high mechanical advantage so that even if the fluid pressure holding the valve closed is high the valve can be opened by the exertion of a small torque on the spindle. After a very small movement the second piston 41 abuts the body 11 and therefrom the valve starts to open. Once the valve has started to open the line pressure acting in the opening direction is no longer confined to the area within the diameter A and there is no longer any question of the pressure on the spigot end 44a or in the annular chamber 35 acting to overcome the tendency of the line pressure to open the valve. As the spindle continues to be turned to retract the piston 13 the fluid in the annular chamber 35 simply passes back through the passages 36, 37 into the line and the fluid flows between the head 28 and inside of the piston 41 and thus through the passages 46 through the body 11 and out through the end connection 47.

One purpose of the slidable second piston 41 and springs 45 is to provide reasonable manufacturing tolerances, since these parts avoid the need for very high precision in the location of the closure member 29 when the valve is closed. In a valve of large size, the necessary tolerance can be provided by making the connecting rod 24 with a corresponding, spring-controlled small range of variation in length. In that case the piston 41 and spigot 44 could be eliminated, the recess 39 and seating 38 being integral with the inlet end fitting 42. The fluid pressure for sealing and relieving the load on the rod 24 could then be provided entirely by the chamber 35 but could again be given any desired relationship to the line pressure by suitable choice of the diameters D and E in relation to the diameter B. The fluid sealing pressure would now act in direct opposition to the opening force exerted through the connecting rod 24, but as above mentioned, the crank and connecting rod have a high mechanical advantage. By using short springs in the connecting rod or providing positive stops to limit the variation in length difficulties due to the tendency of the piston assembly to lag behind the rod would be avoided.

A minor modification possible both in the form of valve illustrated and that last described would be to mount the closure member in the recess 39 and have the seating surface on the piston head 28.

We claim:

1. A fluid control valve comprising a casing having an inlet and an outlet, an annular sealing member surrounding the inlet and in sealed connection with the casing, a piston sealed to the casing and slidable therein towards and away from the inlet and said sealing member, another annular sealing member carried by and sealed to the piston, one of said sealing members being a seating and the other a resilient closure member, one sealing member abutting the other and closing a passage leading from the inlet, outside the piston and through the casing to the outlet when the piston is moved towards the inlet, and leaving the other sealing member and opening the passage when the piston is moved away from the inlet, a mechanism in said casing actuatable from outside the said casing for positively moving the piston between open and closed positions, means acted upon the fluid pressure in the inlet to press said sealing members into contact when closed with a force greater than the force due to the fluid pressure tending to open the valve independently of the precise position to which the piston is brought by the closing action of the mechanism, and spring means acting on one of said sealing members in a direction to bring the sealing members closer together.

2. A valve as set forth in claim 1 wherein said means acted upon by the fluid pressure includes the piston, a passage being provided in the piston through which fluid from the inlet has permanent access to a surface at the back of the piston over an adequate area to overcome the fluid pressure acting on the front of the piston.

3. A fluid control valve as set forth in claim 2 wherein said piston comprises a piston body sliding within a transverse bore in the valve casing, and a skirt united to said piston body and sliding over a cylindrical surface of the valve casing, the inside of the skirt and the outside of the piston body constituting walls of an annular chamber into which opens the passage in the piston.

4. A fluid control valve as set forth in claim 1 wherein the passage between the sealing members when the valve is open continues outside the piston and through part annular slots in the valve casing to the outlet.

5. A fluid control valve as set forth in claim 4 also comprising a dome covering the end of a bore in which the piston works and fairing the passage leading from the annular slots to the outlet.

6. A fluid control valve as set forth in claim 1 wherein said mechanism for positively moving the piston comprises an operating spindle journalled in a bore at right angles to the direction of movement of said piston, an eccentrically located crank pin carried by the inner end of the spindle, and a connecting rod pivoted at one end to said crank pin and at the other end to said piston, the outer end of said spindle projecting out of the casing whereby access may be had to it from outside the valve for rotating it.

7. A fluid control valve as set forth in claim 6 wherein the crank pin and connecting rod occupy substantially a dead-centre position when the closure member is against the seating, a projection on said spindle, and shoulders on the valve casing in the path of said projection located to limit the rotation of the spindle to about 180°, one of the end positions so limited being just beyond said dead-centre position.

8. A fluid control valve comprising a casing having an inlet and an outlet, a first piston sealed to the casing and slidable therein towards and away from the inlet, a second, annular piston sealed to the casing and slidable therein towards and away from the inlet, said second piston being located between the said first piston and the inlet, limiting means limiting the movement of said second piston to a short distance, spring means urging said second piston away from the inlet, annular sealing members respectively carried by said pistons, one being a seating and the other a resilient closure member, means actuatable from outside the valve for positively moving said first piston between an open position and a closed position, said first piston when in closed position bringing said sealing members into abutment and holding said second piston in a position within the limits imposed by said limiting means as well as thereby closing a passage leading from the inlet, outside the first piston and through the casing to the outlet and said first piston when moved to open position separating said sealing members by a greater distance than said second piston can follow under the action of said spring means in moving it up to the limit imposed by said limiting means, thereby opening said passage through the valve, the fluid pressure from the inlet having access to the back of said second piston over an area sufficient to press said sealing members into contact when the first piston is in closed position with a force greater than the force of the fluid tending to move said sealing members apart.

9. A fluid control valve as set forth in claim 8 wherein the fluid pressure has access from the inlet to an area of the back of the first mentioned piston such that the effect of the fluid pressure is to relieve the mechanism substantially completely of load when the valve is closed.

10. A fluid control valve as set forth in claim 12 wherein said mechanism includes an eccentric crank pin and a connecting rod and passes through a dead-centre position when the valve is closed.

11. A fluid control valve as set forth in claim 10 also comprising stop means which checks the movement of said mechanism in one direction just beyond the dead-centre position.

12. A fluid control valve comprising a casing having an inlet and an outlet, a piston sealed to the casing and slidable therein, two sealing members namely an annular resilient closure member and an annular seating, one sealed to said casing and the other sealed to said piston, said sealing members when in contact co-operating to close a passage through the casing from the inlet to the outlet, a mechanism in said casing operable from outside the casing for moving said piston from a position in which said sealing members are positively separated to open the passage from the inlet to the outlet, through a distance a little more than sufficient to bring said sealing members into contact, spring biased means acting on one of said sealing members in a direction to move it towards the other thus ensuring that said sealing members come into contact before said operating mechanism has completed its closing movement but still being free to yield a little further when said operating mechanism has made its maximum movement in the closing direction, and means providing access from the inlet to an effective area at the back of the piston when the sealing members are in contact which is greater than the area on which the fluid pressure acts in a direction tending to separate the sealing members.

13. A fluid control valve including a casing having an inlet and an outlet, a piston slidable in the casing, two annular sealing members namely an annular resilient closure member and an annular seating one sealed to said casing and the other sealed to said piston, said sealing members when in contact co-operating to close a passage through the casing from the inlet to the outlet and the fluid pressure having access to the back of the piston, and mechanism in said casing operable from outside the casing for moving said piston from a position in which said sealing members are positively separated to open the said passage to a position in which said sealing members are in contact without the action of the fluid pressure at the back of the piston being impeded, wherein said piston is a structure comprising a head, a central body on said head and a skirt on said head, said skirt being spaced from said body to leave an annular space between said body and skirt bounded at one end by said head, the mechanism being linked to said body, said casing including a part having a bore in which said body is slidably sealed and a surface on which said skirt is slidably sealed so that said part forms with said annular space an annular chamber, the controlled fluid passage passing outside said skirt and said surface and a further passage being provided in said body open to the controlled fluid pressure at all times at one end and opening at the other end into said annular chamber.

14. A fluid control valve comprising a casing having an inlet and an outlet, a piston moving in the casing, two sealing members, one a resilient closure member and the other a seating, one of said sealing members being carried by said piston and the other being connected fluid tight with the casing, operating mechanism outside the casing linked to the piston for moving it between a position in which the sealing members are separated to open a passage from the inlet to the outlet of the casing and a position in which the sealing members are in contact, this contact being reached before the operating mechanism has completed its movement, spring controlled means allowing for the completion of the movement, means sealing the piston to the casing without impeding the linking of the mechanism to the piston, and means to which the fluid pressure controlled by the valve has access when the valve is closed acting to press the sealing members together under pressure greater than the fluid pressure tending to force the sealing members apart.

References Cited in the file of this patent

UNITED STATES PATENTS

| | | |
|---|---|---|
| 845,063 | Desper | Feb. 26, 1907 |
| 1,359,521 | Mueller | Nov. 23, 1920 |
| 1,483,991 | Slattery | Feb. 19, 1924 |
| 2,679,856 | Gerritsen | June 1, 1954 |
| 2,698,158 | Granberg | Dec. 28, 1954 |
| 2,725,891 | Bourguignon | Dec. 6, 1955 |

FOREIGN PATENTS

| | | |
|---|---|---|
| 372,048 | Great Britain | May 5, 1932 |
| 112,532 | Australia | Mar. 13, 1940 |